United States Patent
Seki et al.

(10) Patent No.: US 11,959,255 B2
(45) Date of Patent: Apr. 16, 2024

(54) WORK MACHINE CONTROL DEVICE, EXCAVATING MACHINE CONTROL DEVICE, AND WORK MACHINE CONTROL METHOD

(71) Applicant: Komatsu Ltd., Tokyo (JP)

(72) Inventors: Yohei Seki, Tokyo (JP); Masataka Ozaki, Tokyo (JP)

(73) Assignee: Komatsu Ltd., Tokyo (JP)

( * ) Notice: Subject to any disclaimer, the term of this patent is extended or adjusted under 35 U.S.C. 154(b) by 908 days.

(21) Appl. No.: 16/971,707

(22) PCT Filed: Mar. 11, 2019

(86) PCT No.: PCT/JP2019/009800
§ 371 (c)(1),
(2) Date: Aug. 21, 2020

(87) PCT Pub. No.: WO2019/188222
PCT Pub. Date: Oct. 3, 2019

(65) Prior Publication Data
US 2020/0385958 A1 Dec. 10, 2020

(30) Foreign Application Priority Data
Mar. 30, 2018 (JP) ................................ 2018-070208

(51) Int. Cl.
*E02F 9/00* (2006.01)
*E02F 3/00* (2006.01)
(Continued)

(52) U.S. Cl.
CPC ............ *E02F 9/262* (2013.01); *E02F 9/2041* (2013.01); *G01S 17/89* (2013.01); *E02F 3/431* (2013.01); *G01B 11/245* (2013.01)

(58) Field of Classification Search
CPC ......... E02F 9/262; E02F 9/2041; E02F 3/431; E02F 3/434; E02F 9/261; G01S 17/89;
(Continued)

(56) References Cited

U.S. PATENT DOCUMENTS 6,247,538 B1   6/2001   Takeda et al.
9,026,319 B2   5/2015   Hayashi et al.
(Continued)

FOREIGN PATENT DOCUMENTS

CN   103906877 A   7/2014
CN   105386481 A   3/2016
(Continued)

OTHER PUBLICATIONS

Supplementary European Search Report dated Oct. 8, 2021, issued in the corresponding European patent application No. 19777375.7.
(Continued)

*Primary Examiner* — Yonel Beaulieu
(74) *Attorney, Agent, or Firm* — Locke Lord LLP (57) ABSTRACT

A work machine control device includes a measurement-data acquisition unit that acquires measurement data of a three-dimensional measurement device that is mounted on a work machine including work equipment and measures a three-dimensional shape including a ridgeline of a work target on which the working equipment performs work, and a target calculation unit that calculates and outputs, based on the measurement data regarding the ridgeline of the work target, a distance from the work machine to the work target or an angle of repose of the work target.

7 Claims, 9 Drawing Sheets

(51) Int. Cl.
*E02F 9/20* (2006.01)
*E02F 9/26* (2006.01)
*G01B 11/00* (2006.01)
*G01S 17/00* (2020.01)
*G01S 17/89* (2020.01)
*E02F 3/43* (2006.01)
*G01B 11/245* (2006.01)

(58) Field of Classification Search
CPC ........ G01B 11/245; G06T 2207/10028; G06T 2207/30252; G06T 7/70
See application file for complete search history.

(56) References Cited

U.S. PATENT DOCUMENTS

| | | | |
|---|---|---|---|
| 9,580,883 B2 | 2/2017 | Singh et al. | |
| 10,557,249 B2 | 2/2020 | Tsuji | |
| 11,008,732 B2 | 5/2021 | Nakamura et al. | |
| 2005/0027420 A1* | 2/2005 | Fujishima | E02F 9/2045 |
| | | | 701/50 |
| 2007/0010925 A1 | 1/2007 | Yokoyama et al. | |
| 2007/0299590 A1* | 12/2007 | Shull | E02F 3/844 |
| | | | 701/50 |
| 2014/0180548 A1 | 6/2014 | Edara et al. | |
| 2015/0019086 A1 | 1/2015 | Hayashi et al. | |
| 2016/0053460 A1 | 2/2016 | Singh et al. | |
| 2018/0135273 A1 | 5/2018 | Tsuji | |
| 2019/0003152 A1 | 1/2019 | Nakamura et al. | |
| 2022/0056669 A1* | 2/2022 | Tamasato | G05D 1/0274 |
| 2023/0186191 A1* | 6/2023 | Lane | G01R 31/371 |
| | | | 705/7.13 |

FOREIGN PATENT DOCUMENTS

| | | | | |
|---|---|---|---|---|
| CN | 107532401 A | 1/2018 | | |
| EP | 3878255 A1 * | 9/2021 | ........... | A01B 69/008 |
| JP | H10-088625 A | 4/1998 | | |
| JP | 2002328022 A | 11/2002 | | |
| JP | 2008-133657 A | 6/2008 | | |
| JP | 2010-075798 A | 4/2010 | | |
| JP | 2012-225806 A | 11/2012 | | |
| JP | 2017-014726 A | 1/2017 | | |
| JP | 2017-223511 A | 12/2017 | | |
| WO | 2017/002749 A1 | 1/2017 | | |

OTHER PUBLICATIONS

International Search Report dated Jun. 4, 2019, issued for PCT/JP2019/009800.

* cited by examiner

WORK MACHINE CONTROL DEVICE, EXCAVATING MACHINE CONTROL DEVICE, AND WORK MACHINE CONTROL METHOD

FIELD

The present invention relates to a work machine control device, an excavating machine control device, and a work machine control method.

BACKGROUND

Work machines are used at work sites. Patent Literature 1 discloses an example of an automatic excavator equipped with a measurement device for measuring distances to an excavation target and a loading target.

CITATION LIST

Patent Literature

Patent Literature 1: JP H10-088625 A

SUMMARY

Technical Problem

In order to automate work of a work machine, it is desired to acquire a parameter regarding a work target.

An aspect of the present invention is to acquire a parameter regarding a work target.

Solution to Problem

According to an aspect of the present invention, a work machine control device comprises: a measurement-data acquisition unit configured to acquire measurement data of a three-dimensional measurement device configured to measure a three-dimensional shape including a ridgeline of a work target on which work equipment performs work, the three-dimensional measurement device being mounted on a work machine including the working equipment; and a target calculation unit configured to calculate and output, based on the measurement data regarding the ridgeline of the work target, a distance from the work machine to the work target or an angle of repose of the work target.

Advantageous Effects of Invention

According to an aspect of the present invention, it is possible to acquire a parameter regarding a work target.

DESCRIPTION OF EMBODIMENTS

Hereinafter, embodiments of the present invention are described with reference to the drawings, but the present invention is not limited thereto. The constituent elements of the embodiment described below can be appropriately combined. In addition, some constituent elements cannot be used.

First Embodiment

[Wheel Loader]

Figure 1:
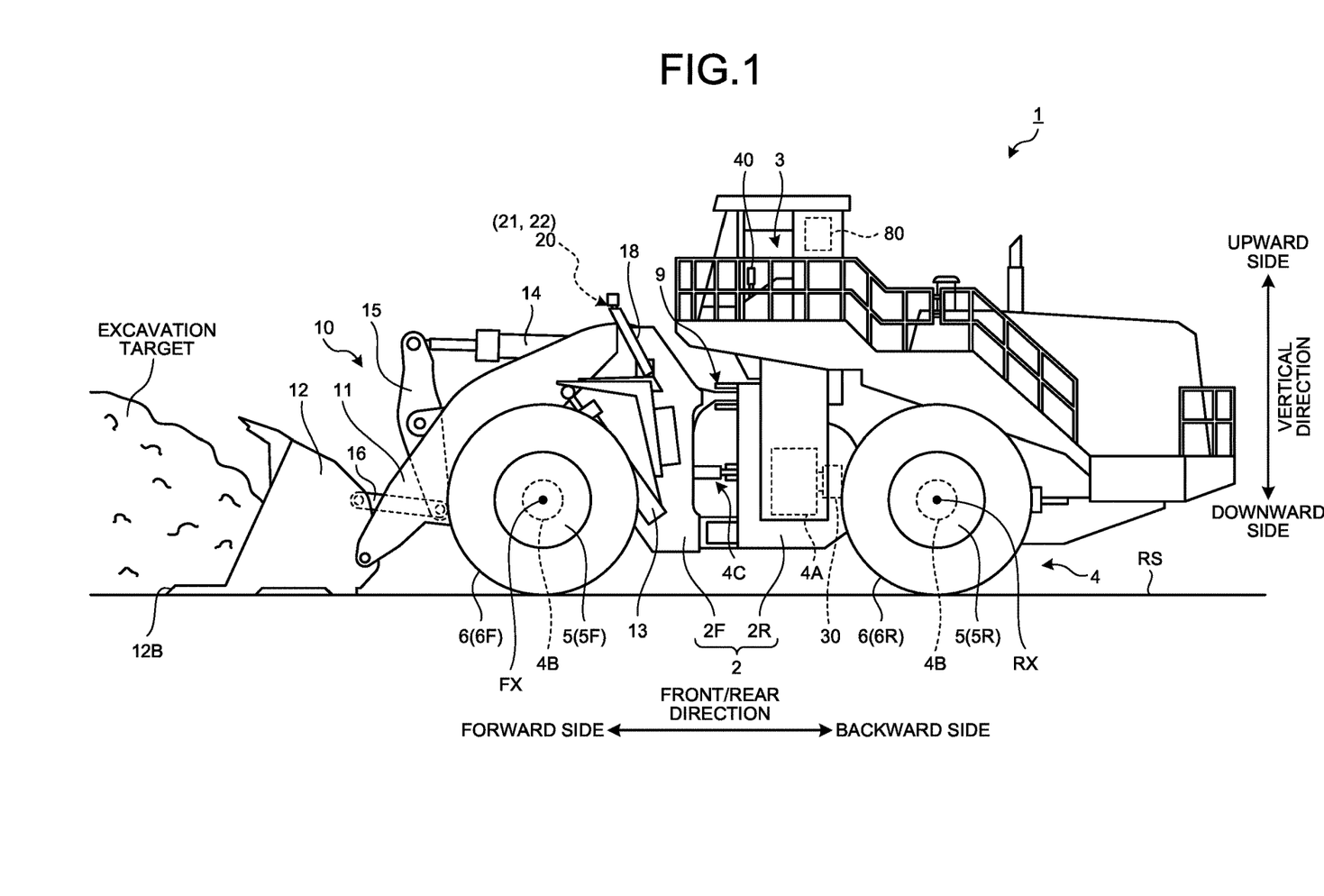
FIG. 1 is a side view illustrating an excavating machine according to a first embodiment.

FIG. 1 is a side view illustrating an example of an excavating machine 1 according to the present embodiment. The excavating machine 1 performs predetermined work on a work target at a work site. In the present embodiment, the excavating machine 1 is assumed to be a wheel loader 1, which is one of articulate excavating machines. The predetermined work includes excavation work and loading work. The work target includes an excavation target and a loading target. The wheel loader 1 performs excavation work for excavating an excavation target and loading work for loading an excavated object excavated by the excavation work on a loading target. The loading work is a concept including discharging work for discharging the excavated object to a discharging target. The excavation target is, for example, at least one of natural ground, a rock pile, coal, and a wall surface. The natural ground is a mountain formed of earth and sand, and the rock pile is a mountain formed of rock or stone. The excavation target may be a mountain formed of at least one of crushed stone, ore, and coal. The loading target is, for example, at least one of a transport vehicle, a predetermined area of a work site, a hopper, a belt conveyor, and a crusher.

As illustrated in FIG. 1, the wheel loader 1 includes a vehicle body 2, a cab 3 provided with a driver's seat, a traveling device 4 supporting the vehicle body 2, work equipment 10 supported by the vehicle body 2, a transmission device 30, a three-dimensional measurement device 20 that measures a measurement target in front of the vehicle body 2, and a control device 80.

The vehicle body 2 includes a front vehicle body 2F and a rear vehicle body 2R. The front vehicle body 2F and the rear vehicle body 2R are coupled via a joint mechanism 9 so as to be bendable.

The cab 3 is supported by the vehicle body 2. At least a part of the wheel loader 1 is operated by a driver on the cab 3.

The traveling device 4 supports the vehicle body 2. The traveling device 4 includes wheels 5. The wheels 5 are rotated by driving force generated by an engine mounted on the vehicle body 2. The wheels 5 are mounted with tires 6. The wheels 5 include two front wheels 5F mounted on the front vehicle body 2F and two rear wheels 5R mounted on the rear vehicle body 2R. The tires 6 include front tires 6F mounted on the front wheels 5F and rear tires 6R mounted on the rear wheels 5R. The traveling device 4 is capable of traveling on the ground RS.

In the following description, the direction parallel to the rotation axis FX of the front wheels 5F is appropriately referred to as a vehicle width direction, the direction orthogonal to the ground contact surfaces of the front tires 6F in contact with the ground RS is appropriately referred to as a vertical direction, and the direction orthogonal to both the vehicle width direction and the vertical direction is appropriately referred to as a front-rear direction. When the vehicle body 2 of the wheel loader 1 travels straight, the rotation axis FX and the rotation axis RX are parallel to each other.

In addition, in the following description, a position or a direction close to the center line of the vehicle body 2 in the vehicle width direction is appropriately referred to as an inside or an inward side of the vehicle width direction, and a position or a direction far from the center line of the vehicle body 2 is appropriately referred to as an outside or an outward side of the vehicle width direction. In addition, in the vehicle width direction, one side of the center line of the vehicle body 2 is appropriately referred to as a right side or a rightward side, and the opposite side or the opposite direction of the right side or the rightward side is appropriately referred to as a left side or a leftward side. In addition, in the front-rear direction, a position or a direction close to the working equipment 10 with respect to the driver's seat of the cab 3 is appropriately referred to as a front side or a forward side, and the opposite side or the opposite direction of the front side or the forward side is appropriately referred to as a rear side or a backward side. In addition, a position or a direction close to the ground contact surfaces of the front tires 6F in the vertical direction is appropriately referred to as a lower side or a downward side, and the opposite side or the opposite direction of the lower side or the downward side is appropriately referred to as an upper side or an upward side.

The front vehicle body 2F is disposed on the front side of the rear vehicle body 2R. The front wheels 5F and the front tires 6F are disposed on the front side of the rear wheels 5R and the rear tires 6R. The front wheels 5F and the front tires 6F are disposed on both sides of the vehicle body 2 in the vehicle width direction. The rear wheels 5R and the rear tires 6R are disposed on both sides of the vehicle body 2 in the vehicle width direction. The front vehicle body 2F bends left and right with respect to the rear vehicle body 2R.

The traveling device 4 includes a driving device 4A, a braking device 4B, and a steering device 4C. The driving device 4A generates driving force for accelerating the wheel loader 1. The driving device 4A includes an internal combustion engine, such as a diesel engine. The driving force generated by the driving device 4A is transmitted to the wheels 5 via the transmission device 30 to rotate the wheels 5.

The braking device 4B generates braking force for decelerating or stopping the wheel loader 1.

The steering device 4C is capable of adjusting the traveling direction of the wheel loader 1. The traveling direction of the wheel loader 1 includes the facing direction of the front vehicle body 2F. The steering device 4C bends the front vehicle body 2F with a hydraulic cylinder to adjust the traveling direction of the wheel loader 1.

In the present embodiment, the traveling device 4 is operated by a driver on the cab 3. The working equipment 10 is controlled by a control device 80. A traveling operation device 40 that operates the traveling device 4 is disposed on the cab 3. The driver operates the traveling operation device 40 to operate the traveling device 4. The traveling operation device 40 includes an accelerator pedal, a brake pedal, a steering lever, and a shift lever for switching moving forward and backward. By operating the accelerator pedal, the traveling speed of the wheel loader 1 is increased. By operating the brake pedal, the traveling speed of the wheel loader 1 is reduced, or traveling is stopped. By operating the steering lever, the wheel loader 1 is swung. By operating the shift lever, moving forward/backward of the wheel loader 1 is switched.

The transmission device 30 transmits the driving force generated by the driving device 4A to the wheels 5.

The working equipment 10 includes a boom 11 rotatably coupled to the front vehicle body 2F, a bucket 12 rotatably coupled to the boom 11, a bell crank 15, and a link 16.

The boom 11 is operated by power generated by a boom cylinder 13. The boom cylinder 13 expands and retracts, and the boom 11 is thereby raised or lowered.

The bucket 12 is a working member including a distal end 12B with a cutting edge. The bucket 12 is disposed on the front side of the front wheels 5F. The bucket 12 is coupled to the distal end of the boom 11. The bucket 12 is operated by power generated by a bucket cylinder 14. The bucket cylinder 14 expands and retracts, and the bucket 12 thereby performs a dumping operation or a tilt operation.

The bucket 12 performs the dumping operation, and the excavated object scooped up by the bucket 12 is thereby discharged from the bucket 12. The bucket 12 performs the tilt operation, and the bucket 12 thereby scoops the excavated object.

[Three-Dimensional Measurement Device]

The three-dimensional measurement device 20 is mounted on the wheel loader 1. The three-dimensional measurement device 20 is supported by a housing 17. The three-dimensional measurement device 20 measures a measurement target in front of the front vehicle body 2F. The measurement target includes an excavation target of the working equipment 10. In addition, the measurement target includes a loading target on which an excavated object excavated by the working equipment 10 is loaded. The three-dimensional measurement device 20 measures a relative position from the three-dimensional measurement device 20 to each of a plurality of measurement points on the surface of the work target. That is, the three-dimensional measurement device 20 measures the three-dimensional shape of the measurement target. In addition, the control device 80 to be described later calculates, based on the measured three-dimensional shape of the work target, the distance between the distal end 12B of the working equipment of the wheel loader 1 and the work target.

The measurement data of the three-dimensional measurement device 20 is three-dimensional data indicating the three-dimensional shape of the work target. The three-dimensional data includes point group data regarding the measurement points. The measurement data of the three-dimensional measurement device 20 may include image data.

The three-dimensional measurement device 20 includes a laser radar 21, which is one of laser measurement devices, and a stereo camera 22, which is one of photographic measurement devices.

[Operation]

Figure 2:
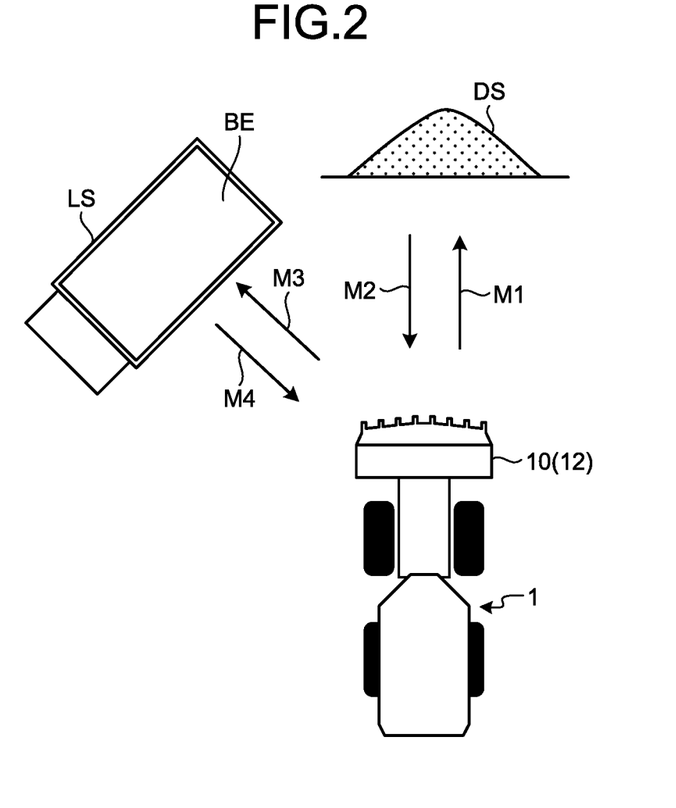
FIG. 2 is a front view illustrating the excavating machine according to the first embodiment.

FIG. 2 is a diagram schematically illustrating an operation of the wheel loader 1 according to the present embodiment. The wheel loader 1 works in a plurality of work modes. The work modes include an excavation work mode in which the bucket 12 excavates an excavation target, and a loading work mode in which the excavated object scooped by the bucket 12 in the excavation work mode is loaded onto a loading target. The excavation target is, for example, natural ground DS on the ground RS. The loading target is, for example, a vessel BE (dump body) of a transport vehicle LS capable of traveling on the ground. The transport vehicle LS is, for example, a dump truck.

In the excavation work mode, the wheel loader 1 moves forward toward the natural ground DS to excavate the natural ground DS with the bucket 12, while no excavated object is held in the bucket 12. The driver of the wheel loader 1 operates the traveling operation device 40 to move the wheel loader 1 forward to approach the natural ground DS, as indicated by the arrow M1 in FIG. 2. The three-dimensional measurement device 20 mounted on the wheel loader 1 measures the three-dimensional shape of the natural ground DS. The control device 80 calculates, based on the measurement data of the three-dimensional measurement device 20, the distance from the wheel loader 1 to the natural ground DS and controls the working equipment 10 so that the bucket 12 excavates the natural ground DS. That is, the control device 80 controls the working equipment 10 so that the distal end 12B and the bottom surface of the bucket 12 are brought into contact with the ground RS, while the wheel loader 1 is moving forward to approach the natural ground DS.

After the bucket 12 plunges into the natural ground DS, excavates the natural ground DS, and scoops the excavated object, the wheel loader 1 moves backward to be separated from the natural ground DS, while the excavated object is held in the bucket 12. The driver of the wheel loader 1 operates the traveling operation device 40 to move the wheel loader 1 backward to be separated from the natural ground DS, as indicated by the arrow M2 in FIG. 2.

Next, the loading work mode is performed. In the loading work mode, the wheel loader 1 moves forward toward the transport vehicle LS to load the excavated object excavated by the bucket 12, while the excavated object is held in the bucket 12. The driver of the wheel loader 1 operates the traveling operation device 40 to approach the transport vehicle LS by swinging and moving forward the wheel loader 1, as indicated by the arrow M3 in FIG. 2. The three-dimensional measurement device 20 mounted on the wheel loader 1 measures the three-dimensional shape of the transport vehicle LS. The control device 80 calculates, based on the measurement data of the three-dimensional measurement device 20, the distance from the wheel loader 1 to the transport vehicle LS and controls the working equipment 10 so that the excavated object held in the bucket 12 is loaded onto the vessel BE of the transport vehicle LS. That is, the control device 80 controls the working equipment 10 so that the boom 11 is raised, while the wheel loader 1 is moving forward to approach the transport vehicle LS. After the boom 11 is raised to position the bucket 12 above the vessel BE, the control device 80 controls the working equipment 10 so that the bucket 12 performs the tilt operation. The excavated object is thereby discharged from the bucket 12 and loaded on the vessel BE.

After the excavated object is discharged from the bucket 12 and loaded on the vessel BE, the wheel loader 1 moves backward to be separated from the transport vehicle LS, while no excavated object is held in the bucket 12. The driver operates the traveling operation device 40 to move the wheel loader 1 backward to be separated from the transport vehicle LS, as indicated by the arrow M4 in FIG. 2.

The driver and the control device 80 repeat the above operation until the vessel BE is filled with the excavated objects.

Figure 3:
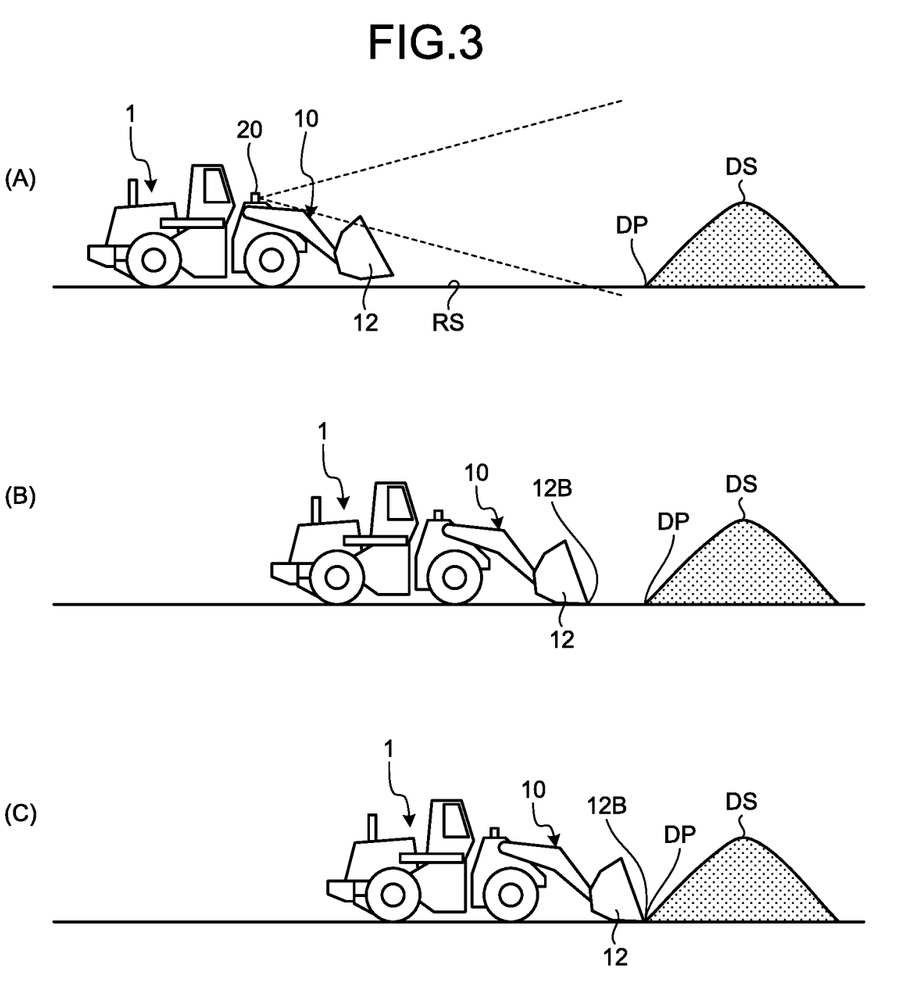
FIG. 3 is a diagram schematically illustrating an operation of the excavating machine according to the first embodiment.

FIG. 3 is a diagram schematically illustrating the excavation work mode of the wheel loader 1 according to the present embodiment. The driver of the wheel loader 1 operates the traveling operation device 40 to move the wheel loader 1 forward to approach the natural ground DS.

As illustrated in FIG. 3(A), the three-dimensional measurement device 20 mounted on the wheel loader 1 measures the three-dimensional shape of the natural ground DS. The control device 80 determines, based on the measurement data of the three-dimensional measurement device 20, the position of a boundary DP between the ground RS and the natural ground DS.

As illustrated in FIG. 3(B), the control device 80 calculates, based on the measurement data of the three-dimensional measurement device 20, the distance between the distal end 12B of the bucket 12 and the boundary DP, lowers the boom 11, and controls the angle of the bucket 12 so that the distal end 12B of the bucket 12 approaches the boundary DP, while the wheel loader 1 is moving forward to approach the natural ground DS.

As illustrated in FIG. 3(C), the wheel loader 1 further moves forward, and the distal end 12B of the bucket 12 is thereby inserted from the boundary DP into the natural ground DS. The natural ground DS is thereby excavated by the bucket 12, and the bucket 12 can scoop the excavated object.

[Control Device]

Figure 4:
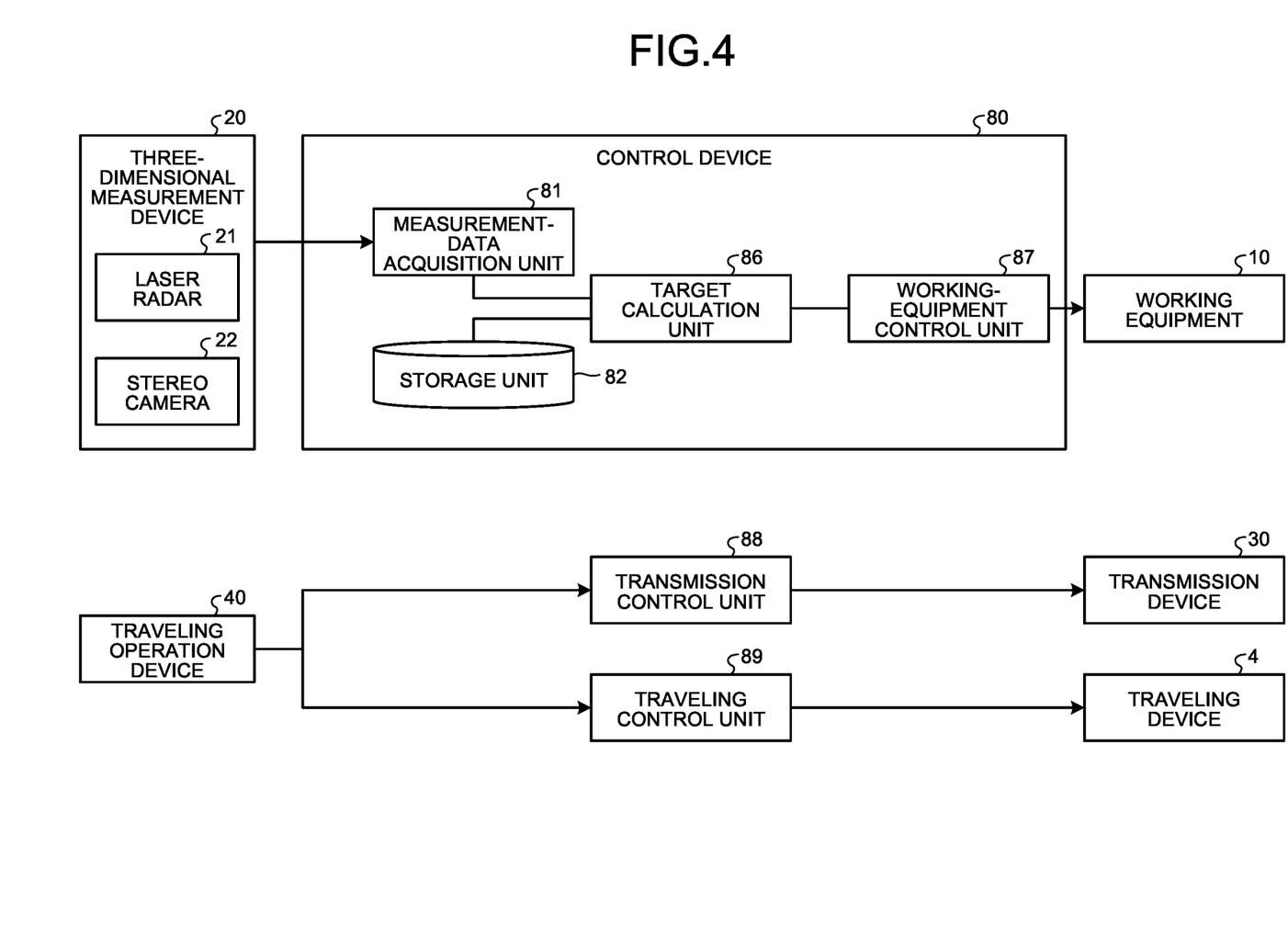
FIG. 4 is a diagram schematically illustrating an excavation work mode of the excavating machine according to the first embodiment.

FIG. 4 is a functional block diagram illustrating the control device 80 of the wheel loader 1 according to the present embodiment. The control device 80 includes a computer system.

The control device 80 is connected to the working equipment 10, the three-dimensional measurement device 20, and an angle sensor 50.

The control device 80 includes a measurement-data acquisition unit 81, a storage unit 82, a target calculation unit 86, and a working-equipment control unit 87.

The measurement-data acquisition unit 81 acquires measurement data from the three-dimensional measurement device 20.

The storage unit 82 stores algorithms for processing the measurement data acquired by the measurement-data acquisition unit 81. The storage unit 82 stores an algorithm for processing the measurement data regarding the natural ground DS measured by the stereo camera 22 and an algorithm for processing the measurement data regarding the natural ground DS measured by the laser radar 21. The algorithms are a procedure, a flowchart, a method, or a program for outputting predetermined data using the measurement data acquired by the measurement-data acquisition unit 81. Depending on the algorithms, the procedure, the method, or the program may be different, or the number of pieces of or types of output data may be different.

The target calculation unit 86 calculates, based on the measurement data acquired by the measurement-data acquisition unit 81, the distance from the wheel loader 1 to the work target. The target calculation unit 86 may calculate, in addition to the data regarding the distance from the wheel loader 1 to the natural ground DS, the angle data regarding the angle of repose of the natural ground DS, and other parameters regarding the natural ground DS. The parameters regarding the natural ground DS include the data regarding the distance from the wheel loader 1 to the natural ground, the angle data regarding the angle of repose of the natural ground DS, the quality of the rock and soil of the natural ground DS, the grain size of the rock and soil forming the natural ground DS, the height of the natural ground DS, the distance to the top of the natural ground DS, the shape of the natural ground DS, and the volume of the natural ground DS.

The working-equipment control unit 87 controls, based on the data regarding the distance between the wheel loader 1 and the boundary DP calculated by the target calculation unit 86, the working equipment 10 that excavates the natural ground DS. In addition, the working-equipment control unit 87 controls, based on the angle data indicating the angle of repose of the natural ground DS calculated by the target calculation unit 86, the working equipment 10 that excavates the natural ground DS.

The control of the operation of working equipment 10 includes the control of the operation of at least one of the boom cylinder 13 and the bucket cylinder 14. The wheel loader 1 includes a hydraulic pump (not illustrated), a boom control valve (not illustrated) that controls the flow rate and direction of the hydraulic oil supplied from the hydraulic pump to the boom cylinder 13, and a bucket control valve (not illustrated) that controls the flow rate and direction of the hydraulic oil supplied from the hydraulic pump to the bucket cylinder 14. The working-equipment control unit 87 outputs a control signal to the boom control valve to control the flow rate and direction of the hydraulic oil supplied to the boom cylinder 13, thereby controlling raising and lowering of the boom 11, and the speed of the raising and lowering. The working-equipment control unit 87 further outputs a control signal to the bucket control valve to control the flow rate and direction of the hydraulic oil supplied to the bucket cylinder 14, thereby controlling the dumping operation and the tilt operation of the bucket 12, and the operation speed.

In the present embodiment, the wheel loader 1 includes a transmission control unit 88 and a traveling control unit 89.

The transmission control unit 88 controls, based on the operation of the traveling operation device 40 by the driver of the wheel loader 1, the operation of the transmission device 30, that is, shift change.

The traveling control unit 89 controls, based on the operation of the traveling operation device 40 by the driver of the wheel loader 1, the operation of the traveling device 4. The traveling control unit 89 outputs operation commands including an accelerator command for operating the driving device 4A, a brake command for operating the braking device 4B, and a steering command for operating the steering device 4C.

[Excavation Work Based on Measurement Data of Stereo Camera]

Figure 5:
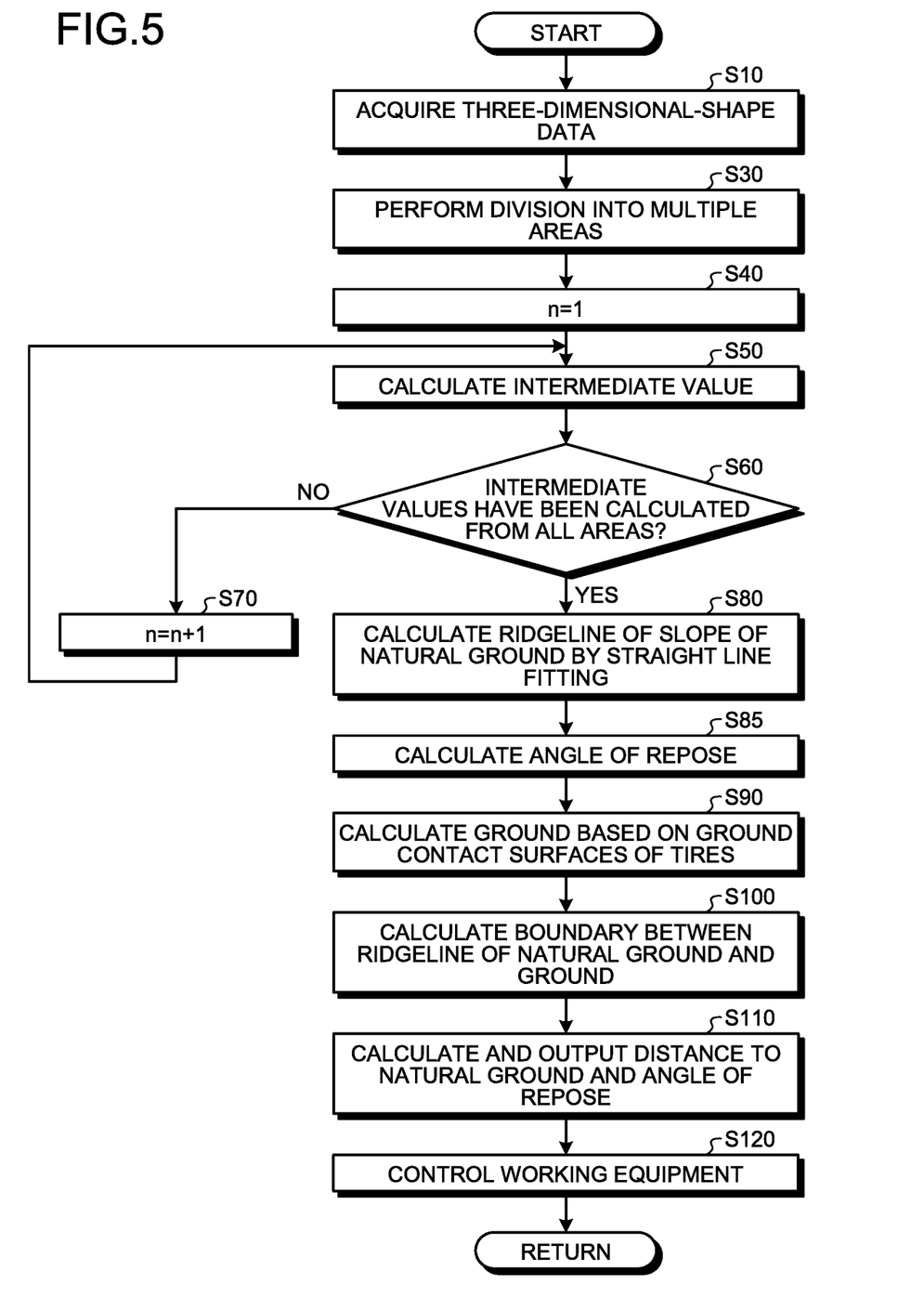
FIG. 5 is a functional block diagram illustrating an excavating machine control device according to the first embodiment.

FIG. 5 is a flowchart illustrating a control method of the wheel loader 1 according to the present embodiment and illustrates excavation work based on the measurement data of the stereo camera 22 regarding the transport vehicle LS.

In the excavation work mode in which the wheel loader 1 moves forward toward the natural ground DS to excavate the natural ground DS with the working equipment 10, the stereo camera 22 measures a measurement target including at least the natural ground DS. In the imaging range of the stereo camera 22 (the field of view of the optical system of the stereo camera 22), the ground RS or an object around the natural ground DS are disposed as the measurement target in addition to the natural ground DS. The measurement-data acquisition unit 81 acquires measurement data from the stereo camera 22 (step S10).

The measurement data of the stereo camera 22 includes the image data regarding the measurement target. The image data is constituted by a plurality of pixels. The image data regarding the measurement target includes first image data acquired by a first camera 22A and second image data acquired by a second camera 22B. The stereo camera 22 performs a stereo process on the image data (the first image data and the second image data) to calculate three-dimensional-shape data.

The measurement-data acquisition unit 81 acquires, from the stereo camera 22, the three-dimensional-shape data that is the measurement data of the stereo camera 22 (step S10).

The three-dimensional-shape data includes point group data, which is a set of point data calculated for each pixel of the image data of the stereo camera 22. The point group data is, for example, data regarding the distance from the stereo camera.

In the present embodiment, the target calculation unit 86 determines the ridgeline of the natural ground DS and calculates, based on the three-dimensional-shape data regarding the ridgeline, and outputs the distance from the wheel loader 1 to the natural ground DS or the angle of repose of the natural ground DS.

Figure 7:
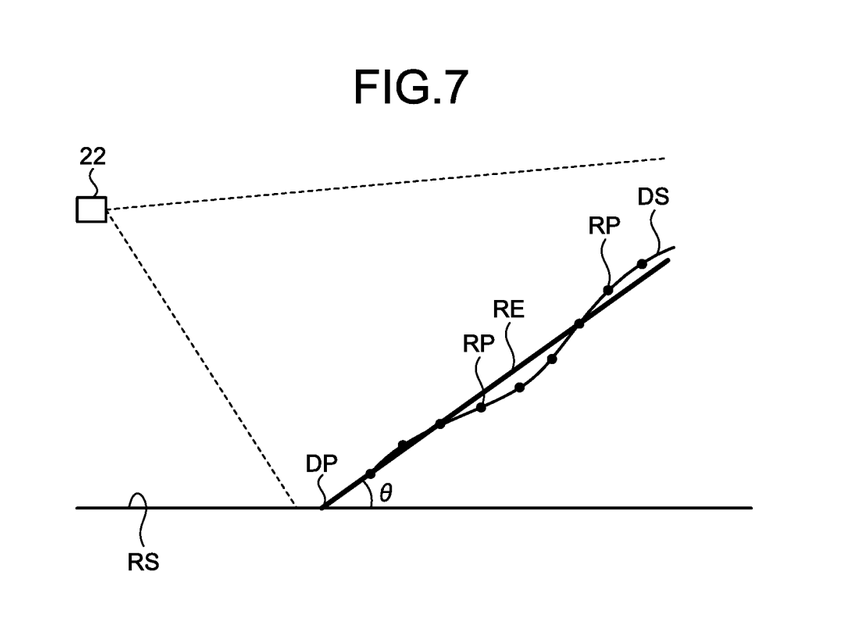
FIG. 7 is a diagram schematically illustrating the excavating machine control method according to the first embodiment.

Since the stereo camera 22 can acquire a wide range of point group data and measure the topography of a wide area of the natural ground DS, it is difficult to determine which point group data is the data regarding the ridgeline, and the cross section of the natural ground as illustrated in FIG. 7 to be described later cannot be determined. For this reason, in order to determine the ridgeline, the target calculation unit 86 divides the three-dimensional-shape data acquired by the stereo camera 22 into a plurality of areas DA (step S30).

Figure 6:
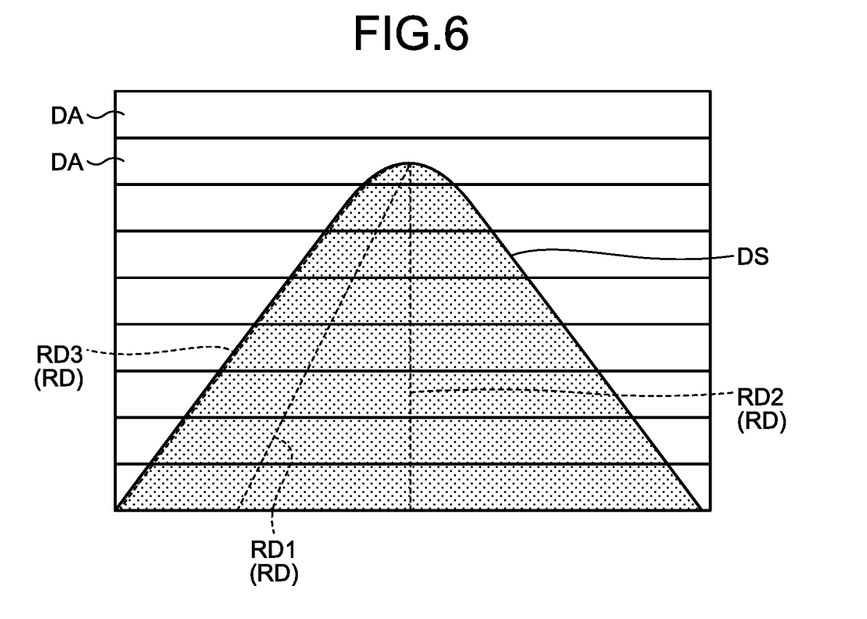
FIG. 6 is a flowchart illustrating an excavating machine control method the according to the first embodiment.

FIG. 6 is a diagram illustrating an example of image data acquired by the stereo camera 22 according to the present embodiment.

The target calculation unit 86 divides the image data into a plurality of areas DA. In the present embodiment, the target calculation unit 86 divides the image data in the vertical direction to generate a plurality of areas DA. In the following description, the point group data of each of the areas DA generated by dividing the image data is appropriately referred to as divided point group data.

The target calculation unit 86 divides the image data in the vertical direction to generate a plurality of areas DA. Each of the areas DA is long in the left-right direction. Each of the areas DA includes divided point group data indicating the distance from the wheel loader 1 (the stereo camera 22) to the natural ground DS.

Then, the target calculation unit 86 determines, based on the divided point group data, a ridgeline RD of the natural ground DS in each of the areas DA. The ridgeline RD is a line connecting an arbitrary natural ground from a top DT of the natural ground DS to the boundary DP of the ground, and an approximate ridgeline RD can be derived by, for example, extracting several points near the midpoint in each of the areas DA.

As illustrated in FIG. 6, in the present embodiment, the target calculation unit 86 can determine a diagonal ridgeline RD1 when several points near the midpoint are extracted in each of the areas DA. The ridgeline RD may be a front ridgeline RD2 or a side ridgeline RD3. In addition, in order to determine the front ridgeline RD2, extraction is possible by using several points that are not near the midpoint but have the closest distance in the point group data.

The initial value 1 is set to the counter n (step S40). The target calculation unit 86 determines the point data corresponding to the ridgeline RD in each of the first area DA1 to the N-th area DAN.

The target calculation unit 86 calculates the distance indicated by each of the pixels in one area DA and determines the intermediate value RP of the distances in the area DA (step S50). The intermediate value RP may be one or more. If there are a plurality of intermediate values RP, several points near the intermediate values RP are determined. The intermediate value RP is the data at the center of the sorted data in the area DA and is also called a median value or a middle value.

As described above, the intermediate value RP is calculated for each of the areas DA. The target calculation unit 86 performs the process in step S50 described above on each of the areas DA. That is, the target calculation unit 86 determines whether the process for calculating the intermediate value RP has been completed for all the areas DA (step S60). When it is determined that the process for calculating the intermediate value RP has not been completed for all the areas DA (step S60: No), the counter n is incremented (step S70), and the process returns to step S50.

When it is determined that the process for calculating the intermediate value RP has been completed for all the areas DA (step S60: Yes), the target calculation unit 86 integrates the areas DA and performs linear fitting on the intermediate values RP calculated for the areas DA. The target calculation unit 86 determines an approximate ridgeline RD by a straight line fitting process.

Figure 8:
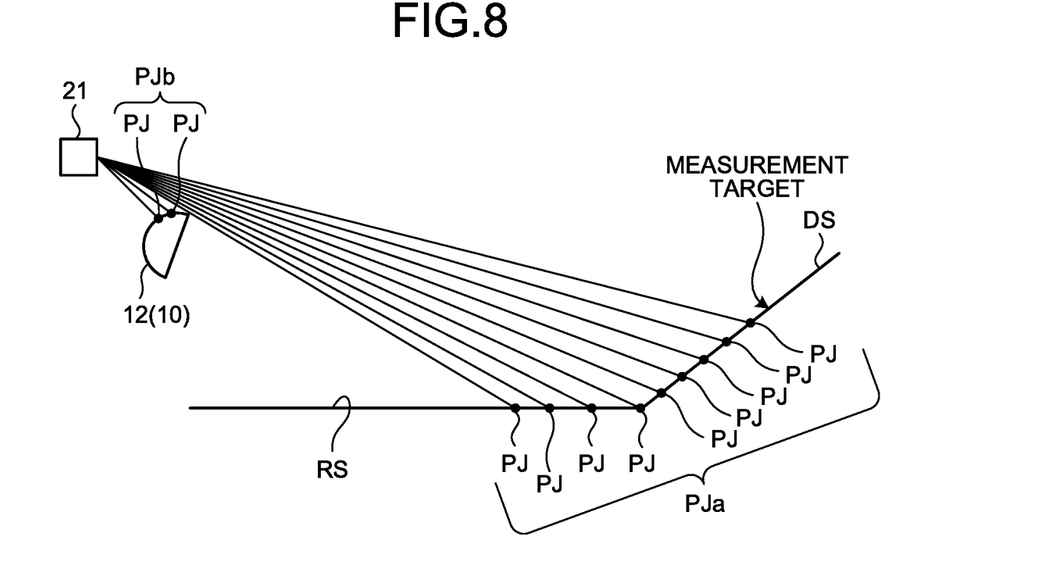
FIG. 8 is a diagram schematically illustrating the excavating machine control method according to the first embodiment.

FIG. 7 illustrates an example of performing the linear fitting process on a plurality of intermediate values RP according to the present embodiment. As illustrated in FIG. 8, the target calculation unit 86 performs a linear fitting process on a plurality of intermediate values RP and calculates an approximate ridgeline RE based on the intermediate values RP (step S80).

The ridgeline RE indicates the shape of the slope of the natural ground DS. In addition, the ridgeline RE indicates the angle of repose θ of the slope of the natural ground DS with respect to the ground RS. The target calculation unit 86 calculates the angle of repose θ of the natural ground DS based on the ridgeline RE (step S85).

The position of the slope of the natural ground DS is defined in the vehicle body coordinate system of the wheel loader 1. The installation position of the stereo camera 22 in the vehicle body coordinate system is known data derived from the design data of the wheel loader 1.

The target calculation unit 86 calculates the position of the ground RS based on the ground contact surfaces of the tires 6 (step S90). The positions of the contact surfaces of the tires 6 in the vehicle body coordinate system are known data derived from the design data of the wheel loader 1. The position of the ground RS in the vehicle body coordinate system is determined by the ground contact surfaces of at least three tires 6 of the four tires 6.

When the ground RS is in the imaging range of the stereo camera 22, the position of the ground RS may be calculated based on the image data of the stereo camera 22. In addition, when the ground RS is in the imaging range of the stereo camera 22, and when the position of the ground RS can be determined based on the contact surfaces of the tires 6, the point group data regarding the ground RS measured by the stereo camera 22 may be removed.

After the position of the slope of the natural ground DS and the position of the ground RS are calculated, the target calculation unit 86 calculates the position of the boundary DP between the ridgeline RD of the natural ground DS and the ground RS (step S100).

The target calculation unit 86 calculates and outputs the distance from the wheel loader 1 to the natural ground DS and the angle of repose θ of the natural ground DS (step S110). The distance from the wheel loader 1 to the natural ground DS may be the distance from the distal end 12B of the bucket 12 to the boundary DP. The distance from the distal end 12B of the working equipment 10 to the boundary DP is calculated using, in addition to the distance from the stereo camera 22 to the boundary DP, the installation position of the stereo camera 22, the installation position of the working equipment 10, and the size and angle of the working equipment 10 in the vehicle body coordinate system.

The working-equipment control unit 87 controls the working equipment 10 based on the distance to the boundary DP or the angle of repose θ of the natural ground DS calculated by the target calculation unit 86 (step S120).

That is, as described with reference to FIG. 3, based on the distance to the boundary DP calculated by the target calculation unit 86, the working-equipment control unit 87 lowers the boom 11 and controls the angle of the bucket 12 so that the distal end 12B of the bucket 12 approaches the boundary DP, while the wheel loader 1 is moving forward to approach the natural ground DS. The wheel loader 1 further moves forward, and the distal end 12B of the bucket 12 is thereby inserted from the boundary DP into the natural ground DS. The natural ground DS is thereby excavated by the bucket 12, and the bucket 12 can scoop the excavated object.

[Effects]

As described above, the working equipment 10 is controlled based on the three-dimensional-shape data regarding the natural ground DS, and the working equipment 10 of the wheel loader 1 can thereby move to an excavation start point of the natural ground DS defined by the boundary DP. Thus, the wheel loader 1 can properly excavate the natural ground DS.

The three-dimensional-shape data regarding the natural ground DS includes the angle of repose of the natural ground DS. Depending on the angle of repose θ, the traction force after plunging in the natural ground DS, the rising speed of the working equipment 10, and the like can be controlled.

In the present embodiment, the image data (point group data) has been divided to determine the ridgeline, but the same process without dividing may be performed to determine the ridgeline.

Second Embodiment

A second embodiment is described. In the following description, constituent elements that are the same as or equivalent to those in the above embodiment are denoted by the same reference signs, and the description thereof is simplified or omitted.

[Excavation Work Based on Measurement Data of Laser Radar]

In the above embodiment, the excavation work based on the measurement data of the stereo camera 22 has been described. In the present embodiment, excavation work based on the measurement data of the laser radar 21 is described.

FIG. 8 is a diagram schematically illustrating a control method of the wheel loader 1 according to the present embodiment and is a diagram illustrating the operation of the laser radar 21. As illustrated in FIG. 8, the laser radar 21 irradiates each of a plurality of irradiation points PJ on the surface of a measurement target with laser light to measure the distance to each of the irradiation points PJ.

In the present embodiment, the target calculation unit 86 classifies, based on the distance from the wheel loader 1 (laser radar 21) to each of the irradiation points PJ, the irradiation points PJ into a plurality of groups and determines, based on at least one of the inclination K (angle of inclination) of each of the groups with respect to the ground RS and the height of gravitational center H of each of the groups, the measurement target.

For example, the measurement target in the excavation work mode includes at least one of the ground RS, the natural ground DS, and an object around the natural ground DS. The target calculation unit 86 determines, based on at least one of the angle of inclination K of each of the groups and the height of gravitational center H of each of the groups, whether the measurement target is the ground RS or the natural ground DS.

The target calculation unit 86 groups a plurality of irradiation points PJ based on the distance to each of the irradiation points PJ. Grouping means, for example, grouping a plurality of irradiation points PJ each having the difference in distance to its adjacent irradiation point PJ equal to or less than a predetermined threshold as one group. In the example illustrated in FIG. 8, for example, the difference in the distance between an irradiation point PJa defined by irradiating the surface of the measurement target and an irradiation point PJb defined by irradiating a part of the working equipment 10 is large. Thus, irradiation points PJa defined on the surface of the measurement target are grouped as one group, and irradiation points PJb defined on the surface of the working equipment 10 are grouped as another group.

The target calculation unit 86 removes the group of the irradiation points PJb indicating the working equipment 10, divides the group of the irradiation points PJa indicating the measurement target into groups, and classifies the irradiation points PJ into a first group and a second group.

Figure 9:
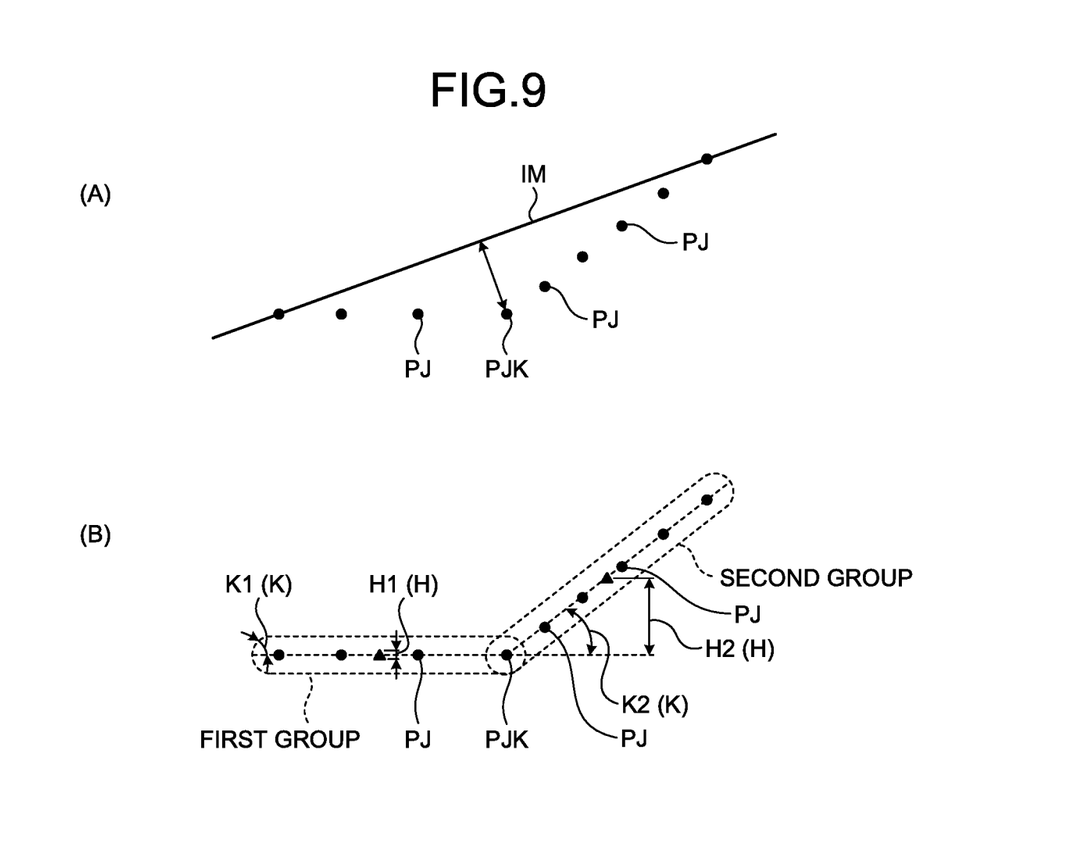
FIG. 9 is a diagram schematically illustrating an excavating machine control method according to a second embodiment.

FIG. 9 is a diagram schematically illustrating a control method of the wheel loader 1 according to the present embodiment and is a diagram schematically explaining group division. Group division means, as illustrated in, for example, FIG. 9(A), that the irradiation points PJ at both ends among a plurality of irradiation points PJ are connected by a virtual straight line IM, the irradiation point PJ having the longest vertical distance from the straight line IM is defined as a division point PJK, and the division point PJK is used as a reference to divide the irradiation points PJ into two groups.

The division point PJK is an irradiation point PJ that is an inflection point on a virtual line connecting a plurality of irradiation points PJ constituting one group. Thus, by using the division point PJK as a reference, the irradiation points PJ can be divided into two groups each arranged in a straight line as illustrated in FIG. 9(B). In this manner, the target calculation unit 86 can divide and classify the irradiation points PJ into the first group and the second group. The grouping method is not limited to the method in the present embodiment, and other algorithms may be used for grouping.

The target calculation unit 86 performs a fitting process on the irradiation points PJ of each of the first group and the second group. After performing the fitting process, the target calculation unit 86 calculates the inclination K of each of the groups with respect to the ground RS and the height of gravitational center H of each of the groups. In the example illustrated in FIG. 9, the target calculation unit 86 calculates the inclination K1 and the height of gravitational center H1 of the first group, and the inclination K2 and the height of gravitational center H2 of the second group.

The target calculation unit 86 determines, based on at least one of the angle of inclination K of each of the groups and the height of gravitational center H of each of the groups, whether the measurement target is the ground RS or the natural ground DS.

The target calculation unit 86 determines that the measurement target is the ground RS when, for example, the angle of inclination K of a group is equal to or less than an angle threshold. The target calculation unit 86 determines that the measurement target is the natural ground RS when the angle of inclination K of a group is equal to or larger than the angle threshold.

Since the ground RS is generally substantially parallel to the horizontal plane, when the angle of inclination K of a group is small and is equal to or less than the angle threshold, the group can be determined to be the ground RS. Since the surface of the natural ground DS is inclined with respect to the ground RS, when the angle of inclination K of a group is equal to or larger than the angle threshold, the group can be determined to be the natural ground DS.

Note that, when the height of gravitational center H of a group is equal to or greater than a height threshold, the target calculation unit 86 may determine that the group is the natural ground DS. When the height of gravitational center H of a group is less than the height threshold, the target calculation unit 86 may determine that the group is the ground RS.

Figure 10:
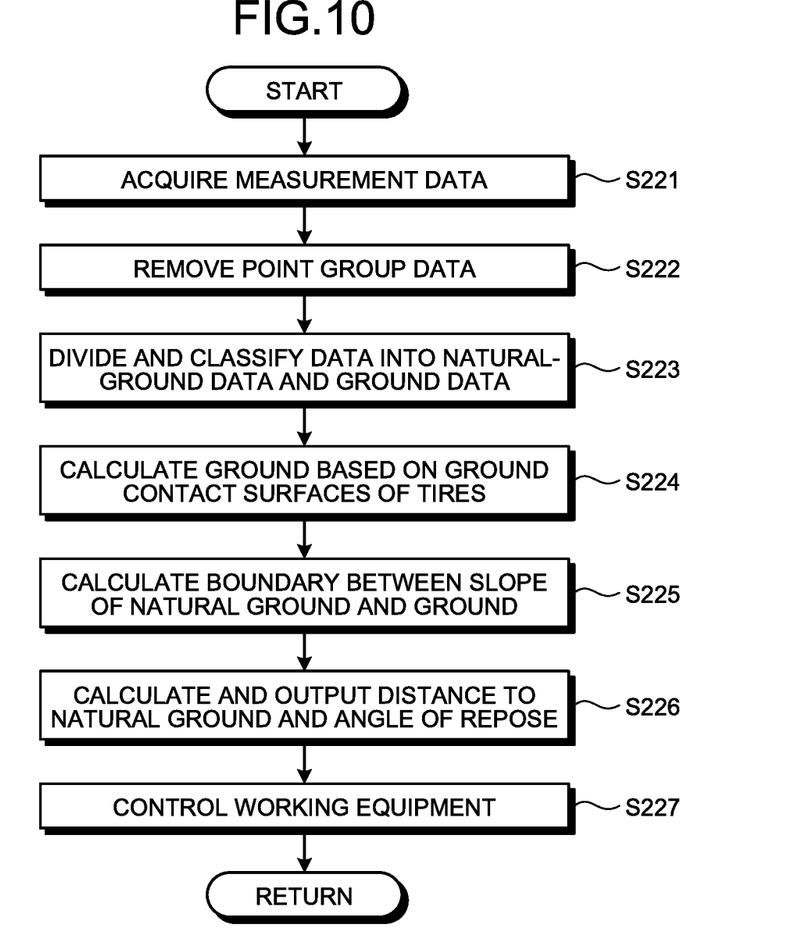
FIG. 10 is a diagram schematically illustrating the excavating machine control method according to the second embodiment.
Figure 11:
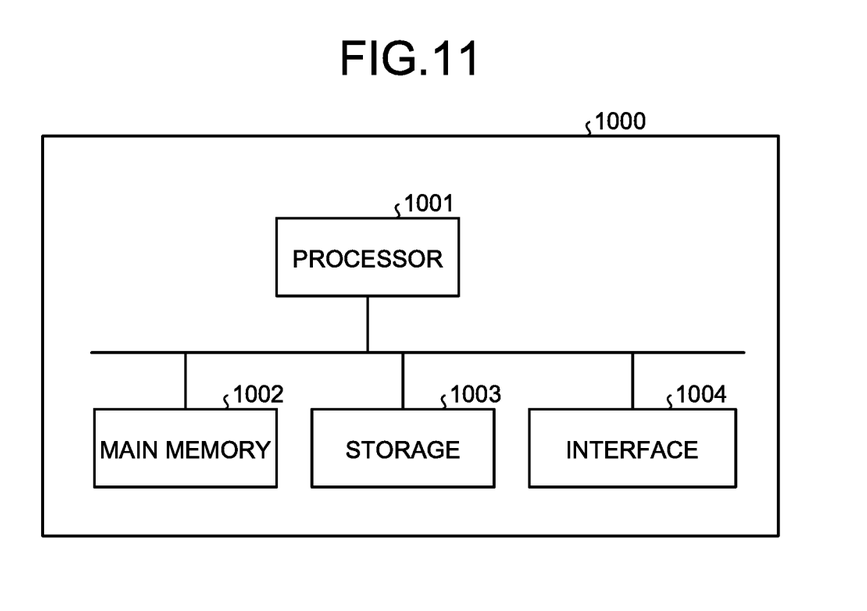
FIG. 11 is a flowchart illustrating the excavating machine control method according to the second embodiment.

FIG. 10 is a flowchart illustrating a control method of the wheel loader 1 according to the present embodiment and illustrates a method for a process based on the measurement data of the laser radar 21 regarding the natural ground DS.

In the excavation work mode in which the wheel loader 1 moves forward toward the natural ground DS to excavate the natural ground DS with the working equipment 10, the laser radar 21 measures the natural ground DS. The measurement data of the laser radar 21 regarding the natural ground DS includes the distance from the laser radar 21 to each of the irradiation points PJ on the surface of the natural ground DS irradiated with the laser light. The measurement data of the laser radar 21 regarding the natural ground DS is output to the control device 80. The measurement-data acquisition unit 81 acquires the measurement data regarding the natural ground DS from the laser radar 21 (step S221).

The laser light emitted from the laser radar 21 is applied not only to the natural ground DS but also to the ground RS or an object around the natural ground DS. As described with reference to FIG. 8, the target calculation unit 86 removes, based on the distance to each of the irradiation points PJ, the point group data regarding the working equipment 10 and the point group data regarding the outliers (step S222).

In addition, as described with reference to FIG. 9(A), the target calculation unit 86 divides the point group data regarding the irradiation points PJ indicating the measurement target into groups. In addition, as described with reference to FIG. 9(B), the target calculation unit 86 determines, for each divided group, the ground RS and the natural ground DS based on at least one of the angle of inclination K of the group with respect to the ground RS and the height of gravitational center H of the group with respect to the ground RS.

That is, the target calculation unit 86 divides and classifies the point group data regarding the irradiation points PJ into a natural-ground group and a ground group (step S223).

The target calculation unit 86 calculates the position of the ground RS based on the ground contact surfaces of the tires 6 (step S224).

The target calculation unit 86 may calculate the position of the ground RS based on the point group data regarding the irradiation points PJ of the ground group classified in step S223.

By performing straight line fitting on the point group data regarding the natural-ground group, the ridgeline of the natural ground DS can be calculated. After the position of the ridgeline of the natural ground DS and the position of the ground RS are calculated, the target calculation unit 86 calculates the position of the boundary DP between the ridgeline of the natural ground DS and the ground RS (step S225).

The target calculation unit 86 calculates and outputs the distance from the wheel loader 1 to the natural ground DS and the angle of repose θ (step S226). The distance from the wheel loader 1 to the natural ground DS may be the distance from the distal end 12B of the bucket 12 to the boundary DP.

The working-equipment control unit 87 controls the working equipment 10 based on the distance to the boundary DP or the angle of repose θ of the natural ground DS calculated by the target calculation unit 86 (step S227).

[Effects]

As described above, also in the present embodiment, the working equipment 10 is controlled based on the three-dimensional data regarding the natural ground DS, and the working equipment 10 can thereby move to the boundary DP which is the excavation start point.

The three-dimensional-shape data regarding the natural ground DS includes the angle of repose of the natural ground DS. Depending on the angle of repose θ, the traction force after the working equipment 10 plunges in the natural ground DS, the rising speed of the working equipment 10, and the like can be controlled.

In the above embodiment, since the distance to the boundary DP of the natural ground DS is calculated using the stereo camera 22 and the laser radar 21, the distance can be accurately calculated from a position where the wheel loader 1 is away from the natural ground DS while the wheel loader 1 is approaching the natural ground DS. Thus, since the working equipment 10 can be controlled to a desired position before the wheel loader 1 reaches the natural ground DS, the working equipment 10 can be controlled with enough time.

[Computer System]

FIG. 12 is a block diagram illustrating an example of a computer system 1000. The control device 80 includes the computer system 1000. The computer system 1000 includes a processor 1001, such as a central processing unit (CPU), a main memory 1002 including a nonvolatile memory, such as a read only memory (ROM), and a volatile memory, such as a random access memory (RAM), a storage 1003, and an interface 1004 including an input/output circuit. The function of the control device 80 is stored in the storage 1003 as a program. The processor 1001 reads the program from the storage 1003, loads the program in the main memory 1002, and executes the above processing according to the program. Note that, the program may be distributed to the computer system 1000 via a network.

The computer system 1000 including the control device 80 is capable of acquiring measurement data of the three-dimensional measurement device 20 that is mounted on the excavating machine 1 including the working equipment 10 and measures a three-dimensional shape of an excavation target to be excavated by the working equipment 10, determining a ridgeline of the excavation target, and calculating and outputting, based on the measurement data regarding the ridgeline, the distance from the excavating machine to the excavation target or the angle of repose of the excavation target.

Other Embodiments

In the above embodiment, the ridgeline of the natural ground DS has been determined with the stereo camera 22 that uses point group data or the laser radar 21 that performs groupings, but determination of the ridgeline is not limited thereto. The ridgeline of the natural ground DS may be determined by, for example, an image recognition technology, a method using artificial intelligence based on the arrangement of the point group data, or other algorithms. For example, the ground data may be determined and removed from the point group data based on some algorithm, and the remaining data may be determined to be the ground data.

In the above embodiments, the target calculation unit 86 has calculated the distance from the wheel loader 1 to the natural ground DS and the angle of repose of the natural ground DS as the parameters of the natural ground DS, but is not limited thereto, and may calculate and output other parameters of the natural ground DS.

In the above embodiment, the working-equipment control unit 87 has been controlled the working equipment 10 based on the data regarding the distance from the wheel loader 1 to the boundary DP. The target calculation unit 86 is capable of calculating the angle data indicating the angle of repose θ of the natural ground DS based on the measurement data of the three-dimensional measurement device 20. The working-equipment control unit 87 may control the working equipment 10 based on the angle data. For example, the working-equipment control unit 87 may plunge the distal end 12B of the bucket 12 into the natural ground DS from the boundary DP when the angle of repose θ of the natural ground DP is small or plunge the distal end 12B of the bucket 12 into the natural ground DS from a position on the slope of the natural ground DS above the boundary DP when the angle of repose θ of the natural ground DP is large.

In the above embodiment, the measurement device mounted on the wheel loader 1 has been the three-dimensional measurement device 20, and the measurement data acquired by the measurement-data acquisition unit 81 has been three-dimensional data indicating the three-dimensional shape of the work target, but they are not limited thereto. As the measurement device, in addition to the three-dimensional measurement device 20 that measures the work target, the camera, which is a photographic measurement device for photographing the work target, and a position measurement device for measuring the position of the work target may be mounted on the wheel loader 1. Alternatively, the measurement device may include an excavated-object determination sensor. In this case, the measurement data acquired by the measurement-data acquisition unit 81 includes, in addition to the three-dimensional data of the work target, at least one of the image data of the work target captured by the camera, the position data of the work target measured by the position measurement device, and the detection data of the excavated-object determination sensor.

For example, when a camera that images the work target is used as the measurement device, the target calculation unit 86 may determine the position of the boundary DP between the excavation target and the ground and calculate the distance between the wheel loader 1 and the boundary DP by an image recognition technology using the image data obtained by imaging the excavation target. As the image recognition technology, a known image recognition technology can be used to determine the position of the boundary DP between the excavation target and the ground.

In the above embodiment, the distance from the distal end 12B of the bucket 12 has been exemplified as the distance from the wheel loader 1 to the work target, but the distance from the wheel loader 1 to the work target is not limited thereto and may be the distance from another part of the bucket 12 or from any part of the wheel loader 1.

In addition, in order to control the working equipment 10, the working-equipment control unit 87 may consider the traveling speed of the wheel loader 1 in addition to the distance to the natural ground DS.

In the above embodiment, the transmission device 30 and the traveling device 4 have been operated by the driver operating the traveling operation device 40, but the transmission control unit 88 and the traveling control unit 89 may automatically control, based on the distance to the natural ground DS and the angle of repose θ, the transmission device 30 and the traveling device 4.

In the above embodiment, the distance to the natural ground DS and the angle of repose θ may be displayed on a display device. The display device may be provided on the cab 3. Alternatively, data indicating the distance to the natural ground DS and the angle of repose θ may be transmitted to a server outside the wheel loader 1.

In the above embodiment, both the laser radar 21 and the stereo camera 22 have been provided in the wheel loader 1 as the three-dimensional measurement device 20. One of the laser radar 21 and the stereo camera 22 may be provided in the wheel loader 1. The three-dimensional measurement device 20 is only required to measure the three-dimensional shape of the work target and the relative position with the work target and is not limited to the laser radar 21 and the stereo camera 22.

In the above embodiment, the distance to the natural ground DS and the angle of repose θ have been calculated, but either one of the distance to the natural ground DS and the angle of repose θ may be calculated, and the working equipment 10 may be controlled based on the calculation result.

In the above embodiments, the work target is not limited to the excavation target and may include, for example, an embankment target, a land leveling target, and an earth removal target.

In the above embodiments, the work site where the wheel loader 1 works may be a mining site, a construction site, or a building site.

The wheel loader 1 may be used for snow removal work, work in the agriculture and livestock industry, or work in the forestry industry.

In the above embodiment, the bucket 12 may have a plurality of blades or may have a straight blade edge.

The working member coupled to the distal end of the boom 11 may not be the bucket 12 and may be a snow plow or a snow bucket used for snow removal work, a bale glove or a fork used for work in the agriculture and livestock industry, or a fork or a bucket used for work in the forestry industry.

The work machine is not limited to the wheel loader and also includes an excavating machine including work equipment, such as an excavator or a bulldozer.

REFERENCE SIGNS LIST

1 WHEEL LOADER (EXCAVATING MACHINE)
2 VEHICLE BODY
2F FRONT VEHICLE BODY
2R REAR VEHICLE BODY
3 CAB
4 TRAVELING DEVICE
4A DRIVING DEVICE
4B BRAKING DEVICE
4C STEERING DEVICE
5 WHEEL
5F FRONT WHEEL
5R REAR WHEEL
6 TIRE
6F FRONT TIRE
6R REAR TIRE
9 JOINT MECHANISM
10 WORKING EQUIPMENT
11 BOOM
12 BUCKET
12B DISTAL END
13 BOOM CYLINDER
14 BUCKET CYLINDER
15 BELL CRANK
16 LINK
20 THREE-DIMENSIONAL MEASUREMENT DEVICE
21 LASER RADAR
22 STEREO CAMERA
22A FIRST CAMERA
22B SECOND CAMERA
30 TRANSMISSION DEVICE
40 TRAVELING OPERATION DEVICE
50 ANGLE SENSOR
80 CONTROL DEVICE
81 MEASUREMENT-DATA ACQUISITION UNIT
82 STORAGE UNIT
86 TARGET CALCULATION UNIT
87 WORKING-EQUIPMENT CONTROL UNIT
88 TRANSMISSION CONTROL UNIT
89 TRAVELING CONTROL UNIT
BE VESSEL (LOADING TARGET)
DS NATURAL GROUND (EXCAVATION TARGET)
FX ROTATION AXIS
LS TRANSPORT VEHICLE
PJ IRRADIATION POINT
RX ROTATION AXIS
RS GROUND

The invention claimed is:

1. A work machine control device comprising:
a measurement-data acquisition processor unit configured to acquire measurement data of a three-dimensional measurement device configured to measure a three-dimensional shape including a ridgeline of a work target on which work equipment performs work, the three-dimensional measurement device being mounted on a work machine including the working equipment; and
a target calculation processor unit configured to determine the measurement data regarding the ridgeline of the work target in the acquired measurement data, and calculate and output, based on the determined measurement data, a distance from the work machine to the work target or an angle of repose of the work target,
wherein a position of a slope of the work target is defined in a work machine vehicle body coordinate system and the target calculation processor unit calculates the position of the ground based on ground contact surfaces of the work machine.

2. The work machine control device according to claim 1, further comprising:
a working-equipment control processor unit configured to control, based on the output distance from the work machine to the work target or the output angle of repose of the work target, the working equipment.

3. The work machine control device according to claim 1, wherein
the target calculation processor unit is configured to calculate, based on the measurement data regarding the ridgeline on which a fitting process has been performed and position data regarding a ground, a distance from the work machine to a boundary between the work target and the ground or the angle of repose of the work target.

4. The work machine control device according to claim 1, wherein
the target calculation processor unit is configured to group the measurement data and determine, based on at least one of an angle of inclination of the group with respect to the ground and a height of gravitational center of the group with respect to the ground, the measurement data regarding the ridgeline of the work target.

5. An excavating machine control device comprising:
a measurement-data acquisition processor unit configured to acquire measurement data of a measurement device configured to measure a natural ground to be excavated by work equipment, the measurement device being mounted on an excavating machine including the working equipment;
a target calculation processor unit configured to calculate, based on the measurement data, a distance from the excavating machine to a boundary between the natural ground and a ground; and
a working-equipment control processor unit configured to control the working equipment based on the distance,
wherein a position of a slope of the natural ground is defined in a work machine vehicle body coordinate system and the target calculation processor unit calculates the position of the ground based on ground contact surfaces of the work machine.

6. The excavating machine control device according to claim 5, wherein
the measurement-data acquisition processor unit is configured to acquire image data obtained by an imaging device imaging the natural ground, and
the target calculation processor unit is configured to calculate the distance from the excavating machine to the boundary between the natural ground and the ground based on an image recognition technology.

7. A work machine control method comprising:
acquiring measurement data of a three-dimensional measurement device configured to measure a three-dimensional shape including a ridgeline of a work target on which work equipment of a work machine performs work; and
determining the measurement data regarding the ridgeline of the work target in the acquired measurement data, and calculating and outputting, based on the determined measurement data, a distance from the work machine to the work target or an angle of repose of the work target,
wherein a position of a slope of the work target is defined in a work machine vehicle body coordinate system and a position of a ground is calculated based on ground contact surfaces of the work machine.

* * * * *